(12) United States Patent
Janson et al.

(10) Patent No.: US 12,209,859 B2
(45) Date of Patent: Jan. 28, 2025

(54) HOLLOW CENTER ANGULAR POSITION SENSOR

(71) Applicant: Caterpillar Inc., Peoria, IL (US)

(72) Inventors: Brett Janson, Hanna City, IL (US); Dhanabalan Raman, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 310 days.

(21) Appl. No.: 17/952,431

(22) Filed: Sep. 26, 2022

(65) Prior Publication Data

US 2024/0102789 A1  Mar. 28, 2024

(51) Int. Cl.
| | | |
|---|---|---|
| *G01D 5/14* | (2006.01) | |
| *E02F 9/26* | (2006.01) | |
| *G01B 7/30* | (2006.01) | |
| *G01D 5/16* | (2006.01) | |
| *E02F 9/12* | (2006.01) | |

(52) U.S. Cl.
CPC .................. *G01B 7/30* (2013.01); *E02F 9/26* (2013.01); *G01D 5/145* (2013.01); *G01D 5/16* (2013.01); *E02F 9/121* (2013.01)

(58) Field of Classification Search
CPC ... G01B 7/30; G01D 5/12; G01D 5/14; G01D 5/142; G01D 5/145; G01D 5/16; G01R 33/02; G01R 33/06; G01R 33/07–098; E02F 9/26; E02F 9/264
See application file for complete search history.

(56) References Cited

U.S. PATENT DOCUMENTS

| | | | |
|---|---|---|---|
| 6,084,400 A | 7/2000 | Steinich et al. | |
| 7,307,415 B2 | 12/2007 | Seger et al. | |
| 8,330,455 B2 | 12/2012 | Duppe et al. | |
| 2004/0021459 A1* | 2/2004 | Jones | G01D 5/145 |
| | | | 324/207.2 |
| 2013/0278247 A1* | 10/2013 | Kunjappan | G01R 33/07 |
| | | | 324/207.2 |
| 2018/0180498 A1* | 6/2018 | Murakami | G01L 3/104 |

* cited by examiner

*Primary Examiner* — Huy Q Phan
*Assistant Examiner* — David B Frederiksen

(57) ABSTRACT

An angular position sensor is disclosed. The angular position sensor has a cylindrical magnet holder that has a base portion attached to a top surface of a shaft and a magnet holding portion extending from the base portion. A magnetic coding is arranged on the outer surface of the magnet holding portion that establishes a magnetic field. A sensor base encircles the base portion of the magnet holder and supports magnetic field sensors that are fixed on an arc-segment. The arc-segments partially overlap so that output signals of the magnetic field sensors are indicative of the angular portion of the sensor base relative to the shaft.

20 Claims, 7 Drawing Sheets

HOLLOW CENTER ANGULAR POSITION SENSOR

TECHNICAL FIELD

The present disclosure generally relates to a magnetic angle sensor, in particular to a swivel joint with an angle sensor.

BACKGROUND

In construction and mining, machines such as hydraulic mining shovels and excavators are typically utilized to remove earthen materials. In general, these construction machines have a lower traveling body and a upper swiveling body that is rotatable relative to the lower traveling body in order to rotate a working tool attached to the upper traveling body. A swivel joint is often connected between the lower traveling body and the upper swiveling body to enable hydraulic fluid to be transmitted between the lower traveling body and the upper swiveling body. A rotation sensor may be attached to the swivel joint in order to determine the rotation angle of the upper swiveling body relative to the lower traveling body. However, traditional rotation sensors are often limited in angle measurements and are designed for swivel joints on diesel construction machines.

U.S. Pat. No. 7,307,415 discloses an contactless rotary shaft position sensor that provides computation of a shaft angle. The sensor has two annular two-pole magnets that are connected by a motion-transmitting gear train. The gear rations are selected such that one of the magnets does not rotate more than one revolution. Pairs of ratiometric Hall-effect or magnetoresistive sensors provide differential voltage signals which are used for sensing angular position of each magnet.

While effective, there remains a need for improved angle of rotation sensors, such as on construction machines in the construction industries.

SUMMARY

In accordance with the present disclosure, an angular position sensor is disclosed. The angular position sensor has a cylindrical magnet holder that has a base portion attached to a top surface of a shaft and a magnet holding portion extending from the base portion. A magnetic coding is arranged on the outer surface of the magnet holding portion that establishes a magnetic field. A sensor base encircles the base portion of the magnet holder and supports magnetic field sensors that are fixed on an arc-segment. The arc-segments partially overlap so that output signals of the magnetic field sensors are indicative of the angular portion of the sensor base relative to the shaft.

In accordance with another aspect of the present disclosure, a work machine that has a swivel joint is disclosed. The swivel joint distributes hydraulic oil between a lower traveling body and an upper swiveling body installed on the lower traveling body. The swivel joint has a first body that is secured to the lower traveling body of the work machine and a second body that is secured to the upper swiveling body of the work machine. A fluid passage for the hydraulic oil is between the first body and the second body of the swivel joint. The swivel joint also has a rotation sensor that produces output signals indicative of a rotation angle of the second body relative to the first body of the swivel joint. The rotation sensor has a cylindrical magnet holder that has a base portion secured to a top surface of the first body and a magnet holding portion that extends from the base portion, and the magnet holding portion has a magnet on its outer surface. The rotation sensor also has a sensor base that encircles the base portion of the magnet holder and is attached to a top surface of the second body. The sensor base supports magnetic field sensors that are fixed on arc-segments, with the arc-segments of the field sensors overlapping partially.

In accordance with an even further aspect of the present disclosure, a method of measuring the rotation angle between a second body of a swivel joint relative to a first body of the swivel joint is disclosed. The method includes attaching a base portion of a cylindrical magnet holder of a rotation sensor to a top surface of the first body of the swivel joint, with the magnet holder also having a magnet holding portion that extends from the base portion. The rotation sensor further includes a sensor base that is attached to a top surface of the second body of the swivel joint. The sensor base supports magnetic field sensors that are fixed on arc-segments, with the arc-segments of the field sensors partially overlapping. The method further includes rotating the second body of the swivel joint relative to the first body, with the magnetic field sensors detecting a magnetic field generated by a magnet that is supported on the magnet holder while the magnet holder is rotated. Output signals from the magnetic field sensors are then generated before being received at a controller, with the controller then calculating the rotation angle of the second body of the swivel joint relative to the first based on the output signals.

These and other aspects and features of the present disclosure will be more readily understood when read in conjunction with the accompanying drawings.

DETAILED DESCRIPTION

Figure 1:
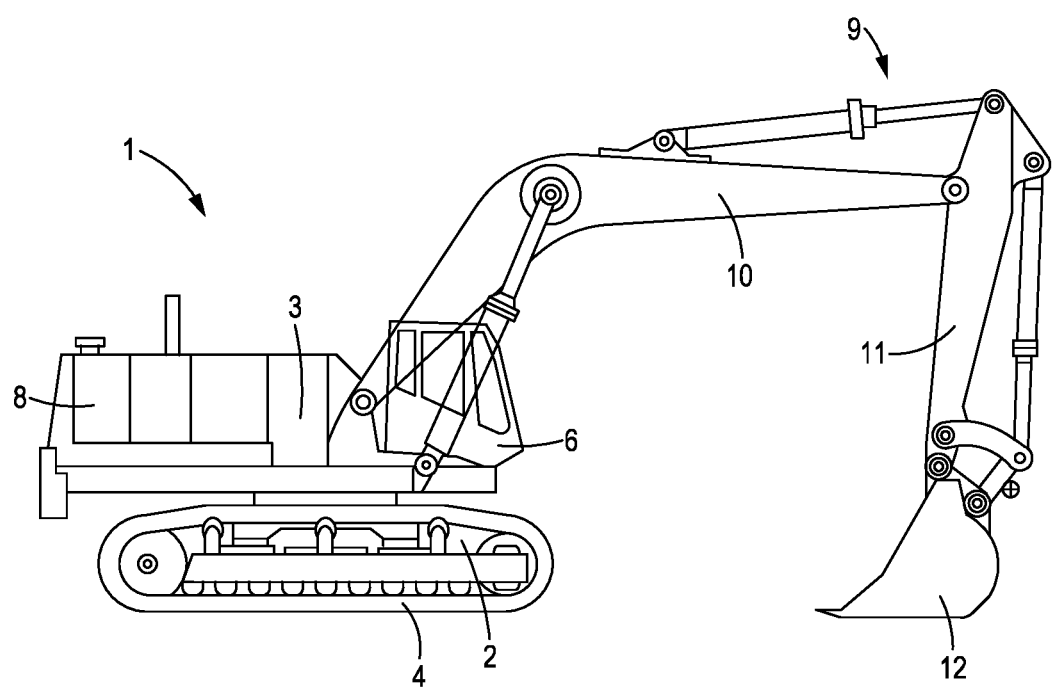
FIG. 1 is a diagrammatic side view of an exemplary work machine, in accordance with the present disclosure.

Referring to FIG. 1, a work machine 1 is shown. The work machine 1 may embody one or more fixed or mobile machines that performs some type of operation associated with an industry such as mining, construction, farming, transportation, or other industries known to utilize heavy equipment. For example, the work machine 1 may include an earth moving machine such as a hydraulic mining shovel, as shown, or a excavator, motor grader, backhoe, a dozer, a loader, a truck, or any other earth moving machine.

In the FIG. 1 embodiment, the work machine 1 includes a lower traveling body 2 that supports an upper swiveling body 3 that is rotatably installed to the lower traveling body 2, and the upper swiveling body 3 being up to 360 degrees rotatable relative to the lower traveling body 2. The lower traveling body 2 is supported on a crawler-type lower movement body 4, but in another exemplary embodiment, the lower movement body 4 may support wheels or other movement supporting means. An operator cab 6 containing the operator controls (not shown) necessary to operate the work machine 1 is mounted on the upper swiveling body 3.

The upper swiveling body 3 has a motor 8, and in the present exemplary embodiment, an internal combustion engine such as a diesel engine is used as the engine as a power generation device, but in another exemplary embodiment, another power generation device is used such as an electric motor, hybrid motor, or the like. The motor 8 is used to power the movements of the work machine 1, such as powering the lower traveling body 2 to move the work machine 1 on a ground surface. The motor 8 can be a diesel or other internal combustion engine, or an electric motor such as a AC or a DC motor. In some exemplary embodiments, when the work machine 1 is electrically powered, such as when the motor 8 is an AC motor, a trail cable, such as power cable 44 discussed below, may be run from a power source and up through the lower traveling body 2 into the upper traveling body and finally to the motor 8. In this exemplary embodiment, the trail cable may be fed through a hollow center of the swivel joint 13.

A working tool 9, such as a shovel attached to a boom or a blade, as shown in the FIG. 1 exemplary embodiment, is attached to the upper swiveling body 3. Specifically, the working tool 9 is raisably and lowerably attached to the upper swiveling body 9, and includes a boom 10 having an arm 11 that is pivotably attached to the distal end of the boom 10, and a bucket 12 that is pivotably attached to the distal end of the arm 11. The bucket 12 is able to dig or hold a predetermined held object, such as earthen materials or construction materials. The position of the boom 10, arm 11, and bucket 12 are controlled by a motor and hydraulic system, which includes the motor 8 and any hydraulic actuators, cylinders, and additional hydraulic motors attached to the upper swiveling body 3, boom 10, arm 11, and bucket 12. More specifically, the motor and hydraulic system is able to raise and lower the boom 10 that is pivotably attached to the upper swiveling body 3, raise and lower the arm 11 that is pivotably attached to the boom 10, and raise and lower the bucket 12 that is pivotably attached to the arm 11.

Figure 2:
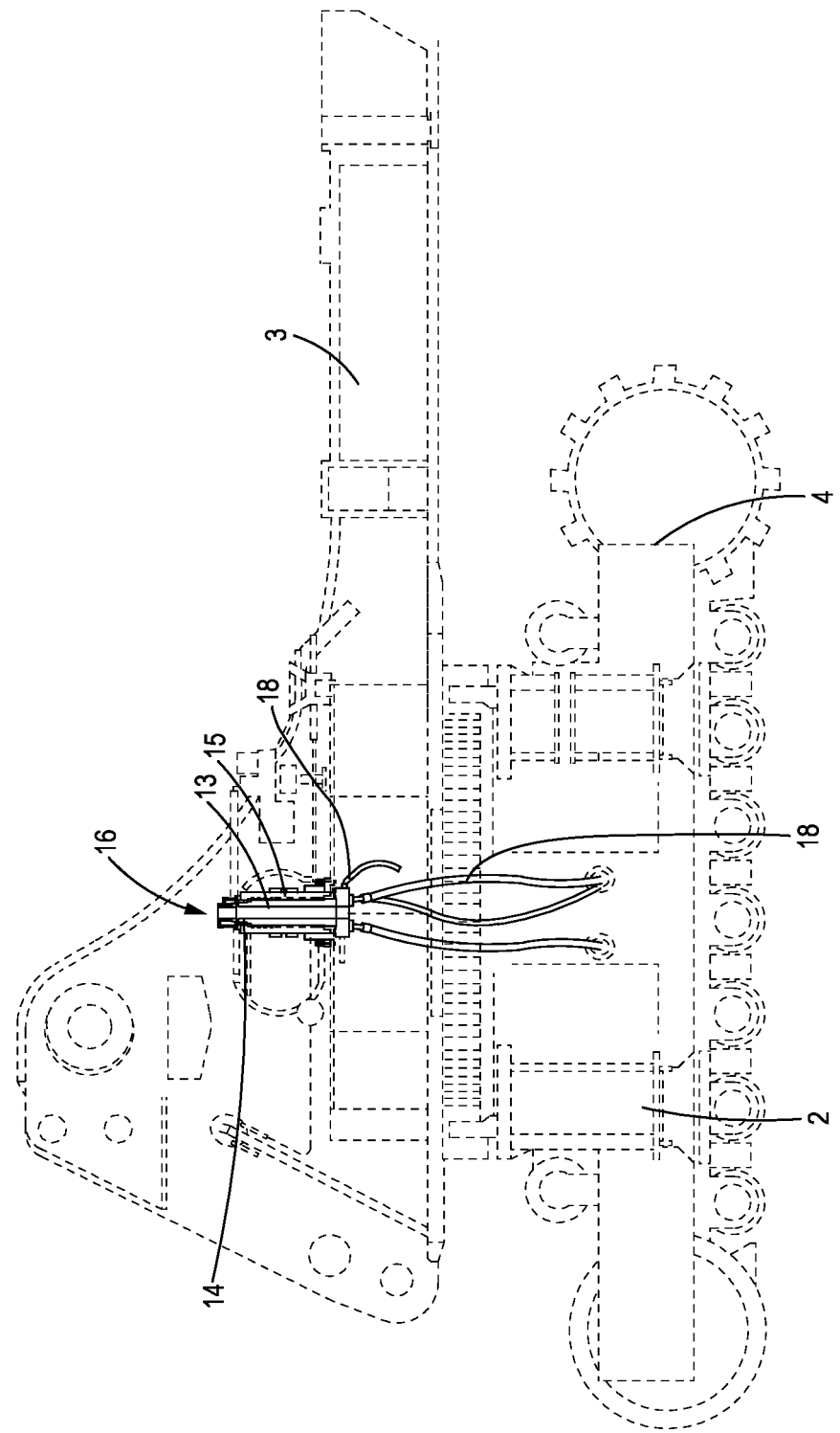
FIG. 2 is a side view of an exemplary swivel joint having an angular position sensor, with the swivel joint attached between a lower traveling body and an upper swiveling body of the work machine of FIG. 1, in accordance with the present disclosure.
Figure 3:
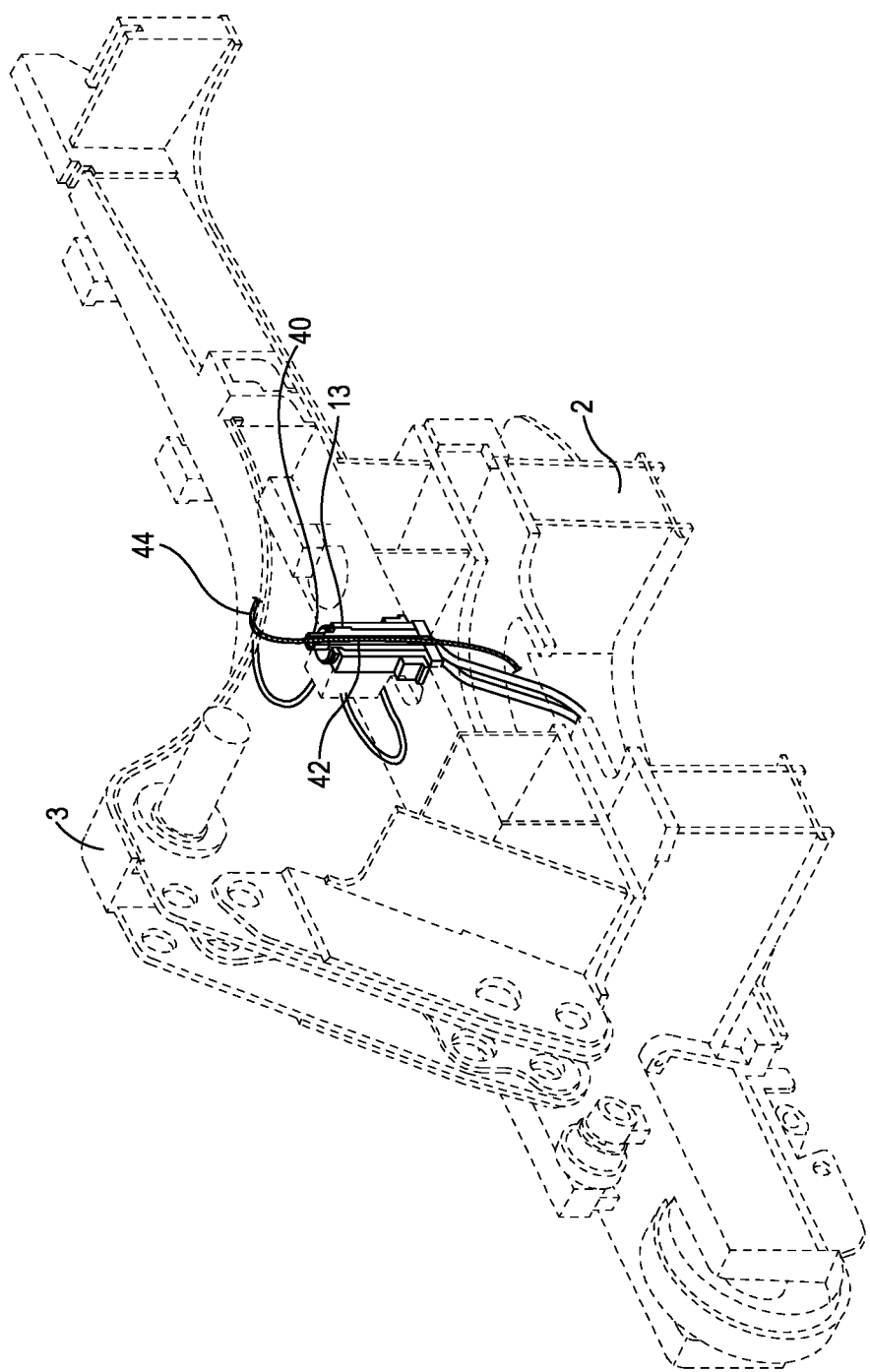
FIG. 3 is a partial view of the swivel joint of FIG. 2, in accordance with the present disclosure.
Figure 4:
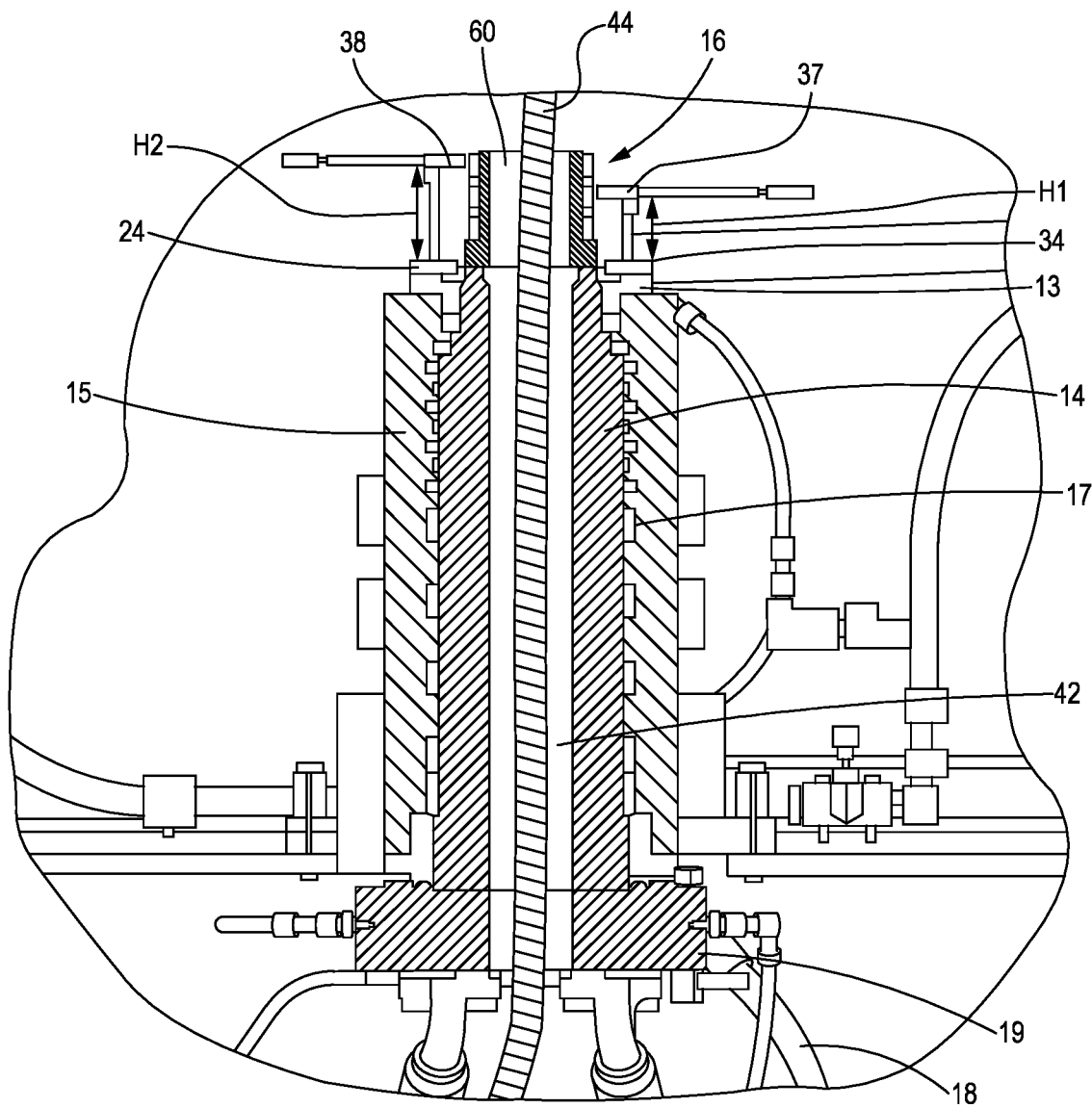
FIG. 4 is a sectional view of the swivel joint of FIG. 2, in accordance with the present disclosure.

As best shown in FIGS. 2-4, the work machine 1 has a swivel joint 13 for distributing hydraulic oil, or any fluids, between the upper swiveling body 3 and the lower traveling body 2. The swivel joint 13 has an internal body 14, and external body 15, a rotation sensor 16, and a fluid passage 17.

In the embodiment depicted in FIGS. 2-4, the internal body 14 of the swivel joint 13 is attached to the lower traveling body 2 of the work machine 1 and may be referred to as a first body 14 of the swivel joint 13. The external body 15 of the swivel joint 13 is attached to the upper swiveling body 3 of the work machine 1 and may be referred to as the second body 15 of the swivel joint 13. During rotation of the upper swiveling body 3 around the lower traveling body 2 of the work machine 1, the second body 15 of the swiveling joint 13 that is attached to the upper swiveling body 3 rotates around the stationary first body 14 of the swivel joint 13, such that the first body 14 acts as a stationary shaft for rotation of the upper swiveling body 3 to rotate around. However, in other exemplary embodiments, the first body 14 is attached to the upper swiveling body 3, and the second body 15 is attached lower traveling body 2, and thus, the first body 14 acts as a rotating shaft within the second body 15.

As the upper swiveling body 3 of the work machine 1 rotates relative to the lower traveling body 2, the swivel joint 13 serves to distribute fluid to any motors, gears, or hydraulics driving movement of the lower movement body 2 through fluid passages 17, best shown in FIG. 4, that exist between the internal body 14 and the external body 15 of the swivel joint 13. Once the fluid reaches the bottom of the swivel joint 13 through the fluid passages 17, the fluid, such as hydraulic fluid or oil, flows through fluid hoses 18, as shown in FIG. 2, that are fluidly connected to the fluid passages 17 at a base 19 of the internal body 14 of the swivel joint 13.

Figure 5:
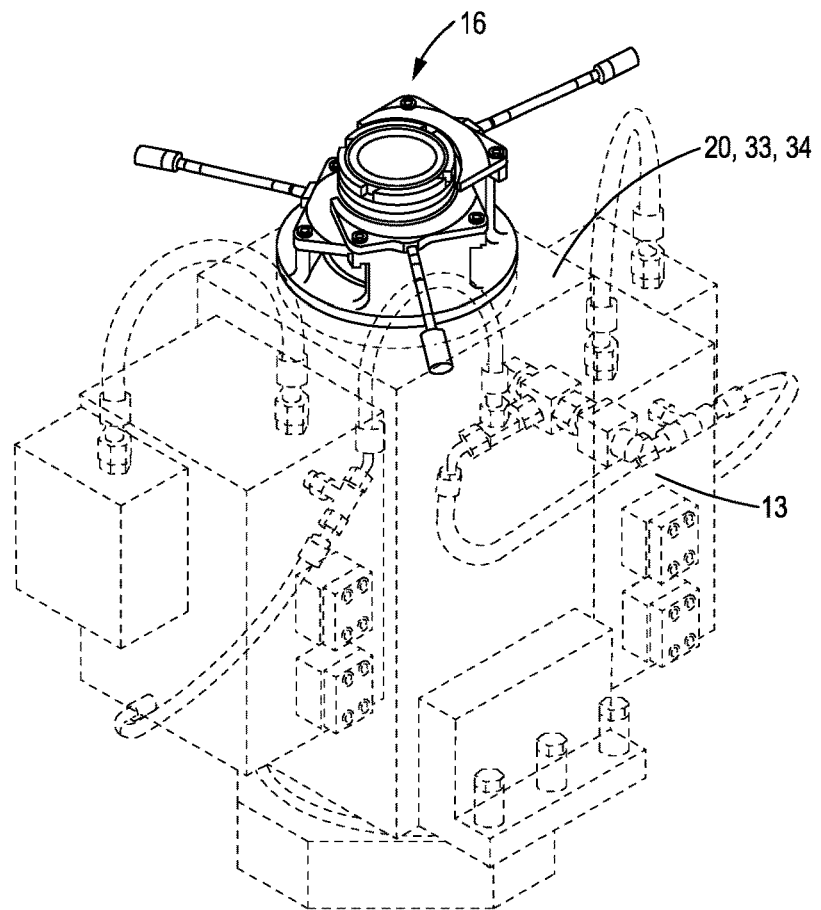
FIG. 5 is a perspective view of the angular position sensor attached to the swivel joint of FIG. 2, in accordance with the present disclosure.

In order to measure the angle of rotation between the upper swiveling body 3 and the lower traveling body 2, or the external body 15 of the swivel joint 13 relative to the internal body 14 of the swivel joint 13, a rotation sensor 16 is used (also referred to as the angular position sensor 16). As shown in FIG. 5, the rotation sensor 16 is attached to a top end 20 of the swivel joint 13.

Figure 6:
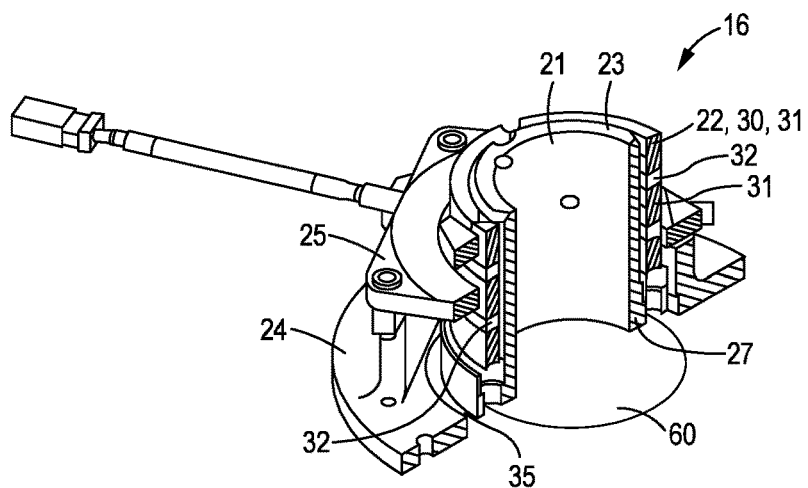
FIG. 6 is a sectional view of the angular position sensor of FIG. 2, in accordance with the present disclosure.

As best shown in FIG. 6, the rotation sensor 16 has a cylindrical magnet holder 21, a magnetic coding 22 arranged on the outer surface 23 (FIG. 7) of the magnet holder 21, and a sensor base 24 that supports magnetic field sensors 25.

Figure 7:
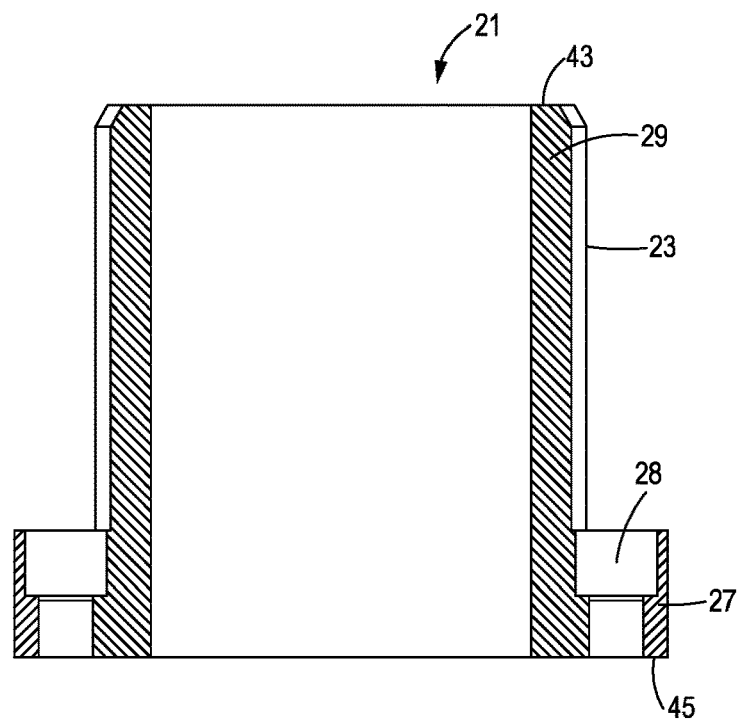
FIG. 7 is a section view of the magnet holder of the angular position sensor of FIG. 2, in accordance with the present disclosure.

Turning to FIG. 7, the cylindrical magnet holder 21 is shown in more detail. The magnet holder 21, as shown in FIGS. 2-4 is attached to a top surface 26 of the internal body 14, also referred to as the shaft 14 or the first body 14, at a base portion 27 of the magnet holder 21. The base portion 27 is attached to the internal body 14 by bolting through attachment holes 28 in the base portion 27, welding, or any other attachment means. Extending upwards from the base portion 27 is a magnet holding portion 29 of the magnet holder 21. The magnet holding portion 29, as best shown in FIG. 6, is configured to support a magnetic coding 22 on the outer surface 23 of the magnet holder 21. Further, magnet holder 21, in one exemplary embodiment, is made of a non-magnetic material, such as aluminum, polymer, resin, or the like, in order to not interfere with any magnetic field generated by the magnetic coding 22 that is detected by the magnetic field sensors 25.

The magnetic coding 22 may comprise a singular magnet 30 that is placed on a magnet support ring 31, such that the magnet 30 occupies a small portion of the magnet support ring 31. As shown in FIG. 6, the magnet holding portion 21 is supporting two magnet support rings 31 each having its own magnet 30, or multiple magnets 30, but any number of magnet support rings 31 may be supported on the magnet holding portion 21. The magnetic support rings 31 are made of a non-magnetic material and hold a magnet 30, with the magnet 30 establishing a magnetic field. Further, the magnet support rings 31 may be placed around the magnet holding portion 21 such that the magnets 30 in the magnet support rings 31 vertically align with the magnets 30 in other magnet support rings 31 that are placed on the magnet holding portion 21. Even further, non-magnetic magnet spacer rings 32 may be placed between the magnet support rings 31 on the magnet holder 21. In a further exemplary embodiment, the magnets 30 are directly built into the magnet holder 21 and no magnet support rings 31 are needed.

Figure 8:
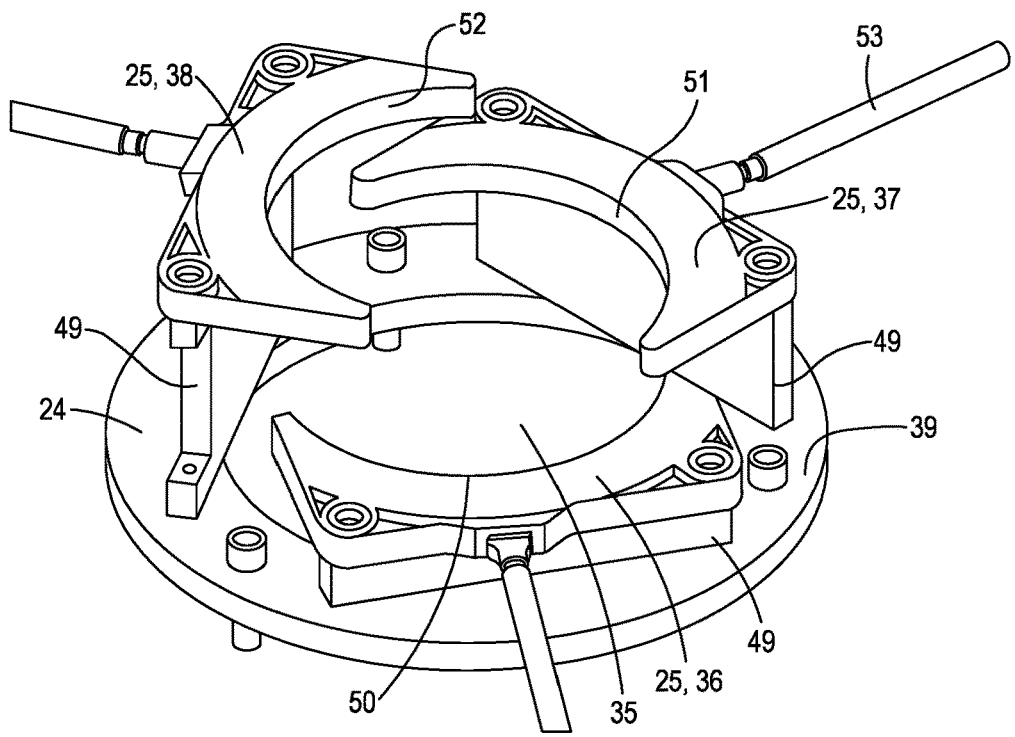
FIG. 8 is a perspective view of the sensor base of the angular position sensor of FIG. 2, in accordance with the present disclosure.

The sensor base 24 is disk shaped and attached to the outer surface of a platform 33, such as the top end 20, or top surface 34, of a swivel joint 13, as shown in FIG. 5. As shown in FIG. 8, the sensor base 24 defines a sensor base aperture 35 in the middle of its disk shaped structure. Referring back to FIG. 5, when attached to the swivel joint 13, or the platform 33, the magnet holder 21 is placed inside of the sensor base aperture 35, such that the sensor base 24 does not contact the magnet holder 21 when the sensor base 24 is attached to the top surface 34 of the external body 15 of the swivel joint 13 and the magnet holder 21 is attached to the top surface 26 of the internal body 26 of the swivel joint 13. In this exemplary embodiment, the sensor base 24 encircles the base portion 27 of the magnet holder 21 in the same transverse plane as the base portion 27. Thus, when the upper swiveling body 3 rotates around the lower traveling body 2, the sensor base 24 rotates around magnet holder 21. In another exemplary embodiment, the sensor base 24 is attached to any platform 33 that rotates around a shaft, or surrounds a rotating shaft, and the magnet holder is attached to said shaft.

Referring to FIG. 8, the sensor base supports magnetic field sensors 25. Each magnetic field sensor 25 is attached to the sensor base 24 by a sensor base attachment 49 protruding in an upwards direction from the sensor base 24. As shown in the FIG. 8 exemplary embodiment, three magnetic field sensors 25 including a first magnetic field sensor 36, a second magnetic field sensor 37, and a third magnetic field sensor 38 are shown attached to the sensor base 24, although, in a further exemplary embodiment, any number of magnetic field sensors 25 may be used.

Each magnetic field sensor 25 may be attached at a different height above the sensor base 24, and specifically a top surface 39 of the sensor base 24, to allow the magnetic field sensors 25 to detect the full 360 degree circumference of the sensor base aperture 35 (or circumference of the arc-segments as described below) of the sensor base 24, thus allowing the magnetic field sensors 25 to detect the magnetic coding 22 without touching or coming in contact with the magnetic coding 22, and specifically to detect any magnetic field generated by the magnetic coding 22, as the magnet holder 21 rotates, or as the sensor base 24 is rotated around the magnet holder 21. Thus, the magnet holder 21 with the magnetic coding 22, in one exemplary embodiment, does not physically contact with the sensor base 24 or the magnetic field sensors 25.

Referring to FIG. 4, the second magnetic field sensor 37 and the third magnetic field sensor 38 are depicted, with the second magnetic field sensor 37 having a height of H1 above the sensor base 24, and the third magnetic field sensor 38 having a height of H2 above the sensor base 24, with H2 being larger than H1. Similarly, the first magnetic field sensor 36, in this exemplary embodiment, would have a height above the sensor base that is less than H1. Turning back to FIG. 8, it is shown that the magnetic field sensors 25 are each attached to the sensor base 24 at different heights in order to allow magnetic field sensors 25 to overlap to ensure no part of the circumference of the sensor base aperture 35 (or the circumference of the arc-segments as described below) is undetectable by the magnetic field sensors 25 as the magnetic coding 22 is rotated around by the sensor base 24, or as the magnet holder 21 rotates with in the sensor base 24.

Each magnetic field sensor 24 has an arc-segment for detecting the magnetic field generated by the magnetic coding 22. For example, still referring to FIG. 8, the first magnetic field sensor 36 has a first arc-segment 50, the second magnetic field sensor 37 has a second arc-segment 51, and the third magnetic field sensor 38 has a third arc-segment 52. As shown, the first arc-segment 50 overlaps vertically with both the second arc-segment 51, and the third arc-segment 52, thus, creating a 360 degree detection zone 40 extending from the first arc-segment 50 upwards to the third arc-segment 52. Thus, in this exemplary embodiment, when the external body 15 of the swivel joint 13 rotates around the internal body 14, the magnetic field sensors 25 are rotated around the magnetic coding 22 of the magnet holder 21.

The arc-segments of each of the magnetic field sensor 25 may overlap with the arc-segments of another magnetic field sensor 25 on each end of said magnetic field sensor 25. For example, the arc-segments on each end of each magnetic field sensor may overlap with another arc-segment of another magnetic field sensor between 1 and 25 degrees of each arc-segment overlapping, or between 25 and 50 degrees of each arc-segment overlapping, or even further with between 50 and 145 degrees of each arc-segment overlapping. In the exemplary embodiment shown in FIG. 6, the first, second, and third magnetic field sensors 36, 37, 38 are spaced 120 degrees apart around the circumference of the sensor base aperture 35, and each arc-segment overlaps 25 degrees. The magnetic field sensors 25, in one exemplary embodiment are anisotropic magnetoresistance (AMR) sensors that enable, for example, 145 degree detection of a magnet relative to the sensor, and specifically, the arc-segment of the sensor.

Figure 9:
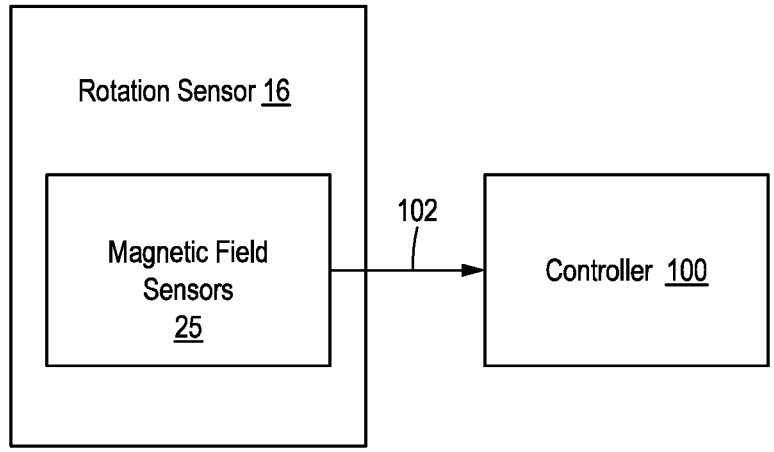
FIG. 9 is a schematic showing the rotation sensor connected to a controller, in accordance with the present disclosure.

Turning to FIG. 9, each of the magnetic field sensors 25 of the rotation sensor 16 detect the magnetic field generated by the magnetic coding 22, or the magnet 30 of the magnetic coding 22, as output signals 102 that are output to a controller 100 when the magnet 30, or magnetic coding 22, is rotated within the arc-segment (or adjacent to the arc-segment) of each magnetic field sensor 25. The output signals 102 are sent as electrical signals from the magnetic field sensors 25 to the controller 100 through wires connecting 53 connecting each of the magnetic field sensors 25 to the controller 100. The controller 100 receives the output signals 102 from each of the magnetic field sensors 16, and calculates a position of the magnet 30 within the detection zone 40. The position of the magnet 30 allows the controller 100 to deduce, or calculate, the angular position, or rotation angle, of the external body 15 of the swivel joint 13 relative to the internal body 14 of the swivel joint 13. This measurement is also indicative of the rotation angle of the upper swiveling body 3 of the work machine 1 to the lower traveling body 2 of the work machine 1 when the swivel joint 13 is a swivel joint of a work machine 1.

Further, when the magnet 30 is located adjacent to the overlapping portion of two arc-segments, the controller 100 receives output signals 102 from both of the magnetic field sensors 25 having the overlapping arc-segments of where the magnet 30 is located adjacent to. The controller 100 calculates the position of the magnet 30 within the overlapping portion of the arc-segments based on the received output signals 102.

In one exemplary embodiment, the magnetic field sensors 25 are Hall-effect or magnetoresistive (MR) sensors are capable of generating an electrical output signal when exposed to a rotating magnetic field. Hall-effect sensors utilize a current-carrying semi-conductor membrane to generate a low voltage perpendicular to the direction of current flow when subjected to a magnetic field normal to the surface of the membrane. Magnetoresistive sensors utilize an element whose resistance changes in the presence of a changing external magnetic field. Due to their placements on the sensor base 24, the Hall-effect or magnetoresistive magnetic field sensors 25 are configured to detect the magnet 30 over a full 360 degree angular range.

Referring back to FIG. 3, a power cable 44 is shown coming from the upper swiveling body 3 traveling through a central aperture 60 of the magnet holder 21 and through an aperture 42 of the internal body 14 of the swivel joint 13 down into the lower traveling body 2. The central aperture 60 extending from a top surface 43 of the magnet holder 21 to a bottom surface 45 of the magnet holder 21. The power cable 44 may be used, for example, when the work machine 1 is electrically driven by electric motor and the power cable needs to travel up through the bottom of the work machine 1 to the electric motor located on the upper swiveling body 3, or to power any device of the work machine 1. Thus, the internal body 14 of the swivel joint 13 and the magnet holder 21 may be hollow in order to allow the passage of the cable 44 between the upper swiveling body 3 and the lower traveling body 2.

INDUSTRIAL APPLICABILITY

In general, the teachings of the present disclosure may find applicability in many industries including, but not limited to, construction machines or the like. More specifically, the teachings of the present disclosure may find applicability in any rotation sensor systems.

In accordance with the scope of the present disclosure, in one such operation it is desirable to measure the rotation angle between a shaft and a body surrounding the shaft, or between the upper swiveling body of a work machine and a lower traveling body of the work machine. Further, it may be desirable to measure the rotation angle between an internal body of swivel joint relative to an external body of the swivel joint. Even further, it may be desirable to have a rotation sensor that is compatible with both a swivel joint located on a work machine driven by an internal combustion engine and a swivel joint located on a work machine driven by an electric motor or electrically powered.

Figure 10:
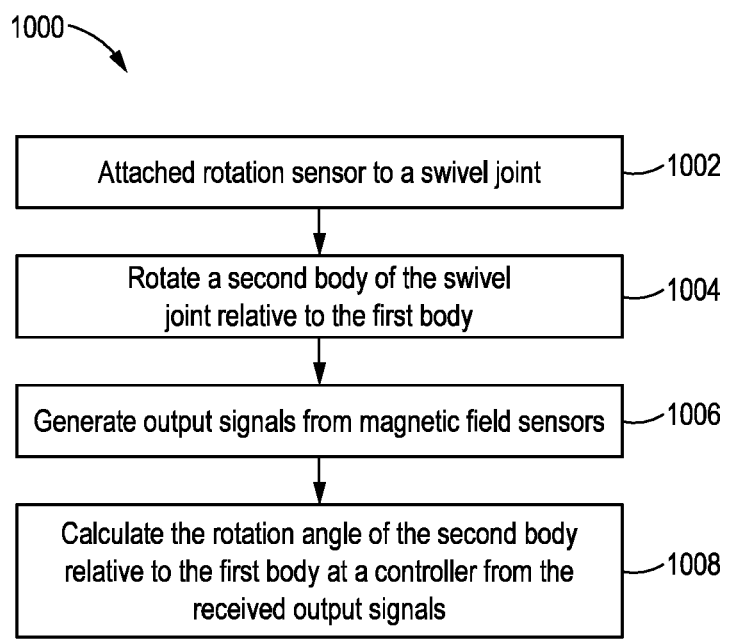
FIG. 10 is a flow chart illustrating a method of measuring the rotation angle of a second body of a swivel joint relative to a first body of the swivel joint, in accordance with the present disclosure.

Turning now to FIG. 10, with continued reference to FIGS. 1-9, a flowchart illustrating an exemplary method 1000 for measuring the rotation angle of a second body 15 relative to a first body 14 of a swivel joint 13 is disclosed.

At block 1002, a rotation sensor 16 is attached to the swivel joint 13. This step may include first attaching a base portion 27 of a magnet holder 21 of a rotation sensor 16 to a top surface 26 of the first body 14, and attaching a sensor base 24 of the rotation sensor 16 to a top surface 34 of the second body 15. The sensor base 24 supports two or more magnetic field sensors 25 each fixed on an arc-segment, with the two or more field sensors arc-segments at least partially overlapping.

At block 1004, the second body 15 of the swivel joint 13 is rotated around the first body 14 of the swivel joint. In this step, the two or more magnetic field sensors 25 supported on the sensor base 24 are rotated around a magnet holding portion 29 of the magnet holder 21, with the magnetic field sensors 25 detecting a magnetic field generated by a magnet 30 on the magnet holder 21.

At block 1006, output signals 102 are generated by the magnetic field sensors 25 when the magnet 30 is detected adjacent to their arc-segments, and specifically, where the magnet is located within the arc-segments of the magnetic field sensors 25. In the case where the magnet is located in the overlapping portion of the two or more magnetic field sensors, both sensors comprising the overlapping arc-segments generate output signals. The output signals are received at a controller 100.

At block 1008, the rotation angle of the second body 15 relative to the first body 14 of the swivel joint 13 is calculated by the controller 100 from the received output signals 102. The controller 100 is able to calculate when the magnet 30 is located in the partially overlapping arc-segments due to receiving output signals 102 from both magnetic field sensors 25 comprising the overlapping arc-segment, and calculate the magnets 30 exact position based on the received output signals.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An angular position sensor comprising:
   a cylindrical magnet holder having a base portion fixedly attached to a top surface of a shaft and a magnet holding portion extending from the base portion;
   a magnetic coding arranged on a outer surface of the magnet holding portion, the magnetic coding establishing a magnetic field;
   a sensor base encircling the base portion of the magnet holder in a same transverse plane as the base portion; and
   the sensor base supporting two or more magnetic field sensors each fixed on an arc-segment, the two or more field sensors arc-segments at least partially overlapping,
   in which the two or more magnetic field sensors having output signals indicative of a angular position of the sensor base relative to the shaft.

2. The angular position sensor of claim 1, in which a first magnetic field sensor of the two or more magnetic field sensors is fixedly attached at a first height above a top surface of the sensor base and a second magnetic field sensor of the two or more magnetic field sensors is fixedly attached at a second height above the top surface of the sensor base, the second height being greater than the first height.

3. The angular position sensor of claim 2, in which between 1 and 50 degrees of the arc-segment segment of the first magnetic field sensor overlaps with between 1 and 50 degrees of the arc-segment of the second magnetic field sensor.

4. The angular position sensor of claim 3, in which the output signals of the two or more magnetic field sensors are received at a controller, the controller calculating where a magnet of the magnetic coding is positioned adjacent to the arc-segments of the first or second magnetic field sensors.

5. The angular position sensor of claim 4, in which the controller calculating when the magnet is positioned adjacent to overlapping arc-segments of the first and second magnetic field sensors.

6. The angular position sensor of claim 2, in which a third magnetic field sensor is fixedly attached at a third height above the top surface of the sensor base, the first, second, and third field sensors being spaced apart by 120 degrees.

7. The angular position sensor of claim 6, in which the arc-segment of the third field sensor partially overlaps with the arc-segments of both the first and second magnetic field sensors.

8. The angular position sensor of claim 7, in which the first, second, and third magnetic field sensors creating a 360 degree cylindrical detection zone, and the first, second, and third magnetic field sensors having output signals indicative of the angular position of the magnetic coding within the detection zone.

9. The angular position sensor of claim 1, in which the magnet holder is non-magnetic.

10. The angular position sensor of claim 1, in which the shaft is an inner body of a swivel joint, and the sensor base is fixedly attached to an outer body of the swivel joint.

11. The angular position sensor of claim 1, in which a space is defined between the sensor base and the magnet holder, and a space defined between the each of the magnetic field sensors and the magnetic coding.

12. The angular position sensor of claim 1, in which the magnet holder has an aperture that extends from a top surface of the magnet holding portion to a bottom surface of the base portion.

13. A work machine having a swivel joint for distributing hydraulic oil between a lower traveling body and an upper swiveling body installed on the lower traveling body, the swivel joint for the work machine comprising:
- a first body secured on the lower traveling body of the work machine;
- a second body secured to the upper swiveling body of the work machine;
- a fluid passage formed between the first body and the second body; and
- a rotation sensor configured to have output signals indicative of a rotation angle of the second body relative to the first body, the rotation sensor comprising:
  - a cylindrical magnet holder having a base portion secured to a top surface of the first body and a magnet holding portion extending from the base portion, the magnet holder having a magnet arranged on an outer surface of the magnet holding portion, and
  - a sensor base encircling the base portion of the magnet holder and attached to a top surface of the second body, the sensor base supporting two or more magnetic field sensors each fixed on an arc-segment, the two or more field sensors arc-segments at least partially overlapping.

14. The work machine of claim 13, in which the first body is an internal body of the swivel joint, and the second body is an exterior body of the swivel joint.

15. The work machine of claim 14, in which the cylindrical magnet holder has a central aperture that travels from the top surface of the magnet holder to a bottom surface of the magnet holder.

16. The work machine of claim 15, in which the internal body has an aperture extending from a top surface of the internal body to a bottom surface of the internal body, and the central aperture of the magnet holder and the aperture of the internal body are configured to allow a cable to extend through the apertures from the lower traveling body to the upper swiveling body.

17. The work machine of claim 14, in which the external body of the swivel joint is rotatable around the internal body of the swivel joint, and the two or more magnetic field sensors rotate with the external body around the magnet holding portion of the magnet holder.

18. A method of measuring a rotation angle of a second body of a swivel joint relative to a first body of the swivel joint, the method comprising:
- attaching a base portion of a cylindrical magnet holder of a rotation sensor to a top surface of the first body, the magnet holder including a magnet holding portion extending from the base portion;
- attaching a sensor base of the rotation sensor to a top surface of the second body, the sensor base supporting two or more magnetic field sensors each fixed on an arc-segment, the two or more field sensors arc-segments at least partially overlapping;
- rotating the second body around the first body, the magnet field sensor detecting a magnetic field generated by a magnet supported on the magnet holder;
- generating output signals from the magnetic field sensors; and
- calculating the rotation angle of the second body relative to the first body at a controller from the received output signals.

19. The method of claim 18, further comprising, after attaching the sensor base, running a cable through a central aperture of the magnet holder and an aperture of the first body.

20. The method of claim 19, in which the cable is a power cable for powering a work machine, the swivel joint distributing hydraulic oil between a lower traveling body and an upper swiveling body installed on the lower traveling body.

* * * * *